United States Patent
Hyodo et al.

(10) Patent No.: US 10,684,707 B2
(45) Date of Patent: Jun. 16, 2020

(54) DISPLAY CONTROL DEVICE, DISPLAY CONTROL METHOD, AND PROGRAM

(71) Applicant: SONY CORPORATION, Tokyo (JP)

(72) Inventors: Katsuya Hyodo, Kanagawa (JP); Kuniaki Torii, Kanagawa (JP); Ryo Fukazawa, Kanagawa (JP); Naoyuki Sato, Tokyo (JP); Koichi Kawasaki, Tokyo (JP); Akihiko Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 622 days.

(21) Appl. No.: 15/315,535

(22) PCT Filed: May 12, 2015

(86) PCT No.: PCT/JP2015/063652
§ 371 (c)(1),
(2) Date: Dec. 1, 2016

(87) PCT Pub. No.: WO2015/198729
PCT Pub. Date: Dec. 30, 2015

(65) Prior Publication Data
US 2017/0205899 A1    Jul. 20, 2017

(30) Foreign Application Priority Data

Jun. 25, 2014   (JP) .................................. 2014-129899

(51) Int. Cl.
*G06F 3/038*   (2013.01)
*G06F 3/01*    (2006.01)
(Continued)

(52) U.S. Cl.
CPC ................ *G06F 3/038* (2013.01); *G06F 3/01* (2013.01); *G06F 3/013* (2013.01); *G06F 3/017* (2013.01);
(Continued)

(58) Field of Classification Search
CPC .......... G06F 3/038; G06F 3/013; G06F 3/167; G06F 3/0425; G06F 3/04812; G06F 3/04842; G06F 3/0488
See application file for complete search history.

(56) References Cited

U.S. PATENT DOCUMENTS

2007/0296643 A1*  12/2007  Ben-Shachar ........ G06F 3/1438
                                                              345/1.1
2013/0167084 A1*   6/2013  Miyake .................. G06F 3/0482
                                                              715/810
(Continued)

FOREIGN PATENT DOCUMENTS

JP    10-091326    4/1998
JP    2009-064109  3/2009
(Continued)

*Primary Examiner* — Kent W Chang
*Assistant Examiner* — Andrew Lee
(74) *Attorney, Agent, or Firm* — Paratus Law Group, PLLC

(57) ABSTRACT

There is provided a display control device to provide a technique that enables a user to easily specify an application as an operation target, the display control device including: an output control unit configured to control an output unit so as to display a display object associated with one application or each of multiple applications; an action detection unit configured to detect a finger pointing direction of a user; and an application selection unit configured to select an application as an operation target based on the display object associated with the one application or each of the multiple applications and the finger pointing direction.

18 Claims, 15 Drawing Sheets

(51) Int. Cl.
   *G06F 3/042*   (2006.01)
   *G06F 3/16*    (2006.01)
   *G06F 3/0481*  (2013.01)
   *G06F 3/0484*  (2013.01)
   *G06F 3/0488*  (2013.01)
(52) U.S. Cl.
   CPC ............ *G06F 3/0425* (2013.01); *G06F 3/167*
           (2013.01); *G06F 3/0488* (2013.01); *G06F*
           *3/04812* (2013.01); *G06F 3/04842* (2013.01);
                       *G06F 2203/04808* (2013.01)

(56) References Cited

U.S. PATENT DOCUMENTS

| | | | |
|---|---|---|---|
| 2013/0176208 A1* | 7/2013 | Tanaka | G06F 3/013 345/156 |
| 2013/0342459 A1 | 12/2013 | Karakotsios et al. | |
| 2014/0123077 A1* | 5/2014 | Kutliroff | G06F 3/017 715/863 |
| 2014/0237367 A1* | 8/2014 | Jung | G06F 3/167 715/728 |
| 2014/0359504 A1* | 12/2014 | Kim | G06F 3/0488 715/768 |

FOREIGN PATENT DOCUMENTS

| | | |
|---|---|---|
| JP | 2011-034140 | 2/2011 |
| JP | 2011-081480 | 4/2011 |
| JP | 2014-014037 | 1/2014 |
| WO | WO2014/050625 A1 | 4/2014 |

\* cited by examiner

DISPLAY CONTROL DEVICE, DISPLAY CONTROL METHOD, AND PROGRAM

CROSS REFERENCE TO PRIOR APPLICATION

This application is a National Stage Patent Application of PCT International Patent Application No. PCT/JP2015/063652 (filed on May 12, 2015) under 35 U.S.C. § 371, which claims priority to Japanese Patent Application No. 2014-129899 (filed on Jun. 25, 2014), which are all hereby incorporated by reference in their entirety.

TECHNICAL FIELD

The present disclosure relates to a display control device, a display control method, and a program.

BACKGROUND ART

In recent years, such a technique is known that a display object associated with one application or each of multiple applications is displayed and an application associated with a display object specified with a click operation using a mouse is selected as an application as an operation target. Further, such a technique is also known that an application associated with a display object specified with a tap operation to a touch panel is selected as an application as an operation target (e.g., refer to Patent Literature 1).

There are various objects such as a window and an icon as examples of the display object. A user can operate the above-selected application as an operation target.

CITATION LIST

Patent Literature

Patent Literature 1: JP 2011-034140A

SUMMARY OF INVENTION

Technical Problem

However, when specifying the display object with the tap operation to the touch panel, it can be troublesome for a user to perform the tap operation to the touch panel as a screen for displaying the display object is enlarged. Further, when specifying the display object with the click operation using the mouse, as the screen for displaying the display object is enlarged, it can be troublesome for the user to move a pointing position with a drag operation.

Therefore, it is desired to provide a technique that enables a user to easily specify an application as an operation target.

Solution to Problem

According to the present disclosure, there is provided a display control device including: an output control unit configured to control an output unit so as to display a display object associated with one application or each of multiple applications; an action detection unit configured to detect a finger pointing direction of a user; and an application selection unit configured to select an application as an operation target based on the display object associated with the one application or each of the multiple applications and the finger pointing direction.

According to the present disclosure, there is provided a display control method including: controlling an output unit so as to display a display object associated with one application or each of multiple applications; detecting a finger pointing direction of a user; and selecting an application as an operation target based on the display object associated with the one application or each of the multiple applications and the finger pointing direction.

According to the present disclosure, there is provided a program for causing a computer to function as a display control device, the display control device including an output control unit configured to control an output unit so as to display a display object associated with one application or each of multiple applications, an action detection unit configured to detect a finger pointing direction of a user, and an application selection unit configured to select an application as an operation target based on the display object associated with the one application or each of the multiple applications and the finger pointing direction.

Advantageous Effects of Invention

As mentioned above, according to the present disclosure, such a technique is provided to enable a user to easily specify an application as an operation target. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
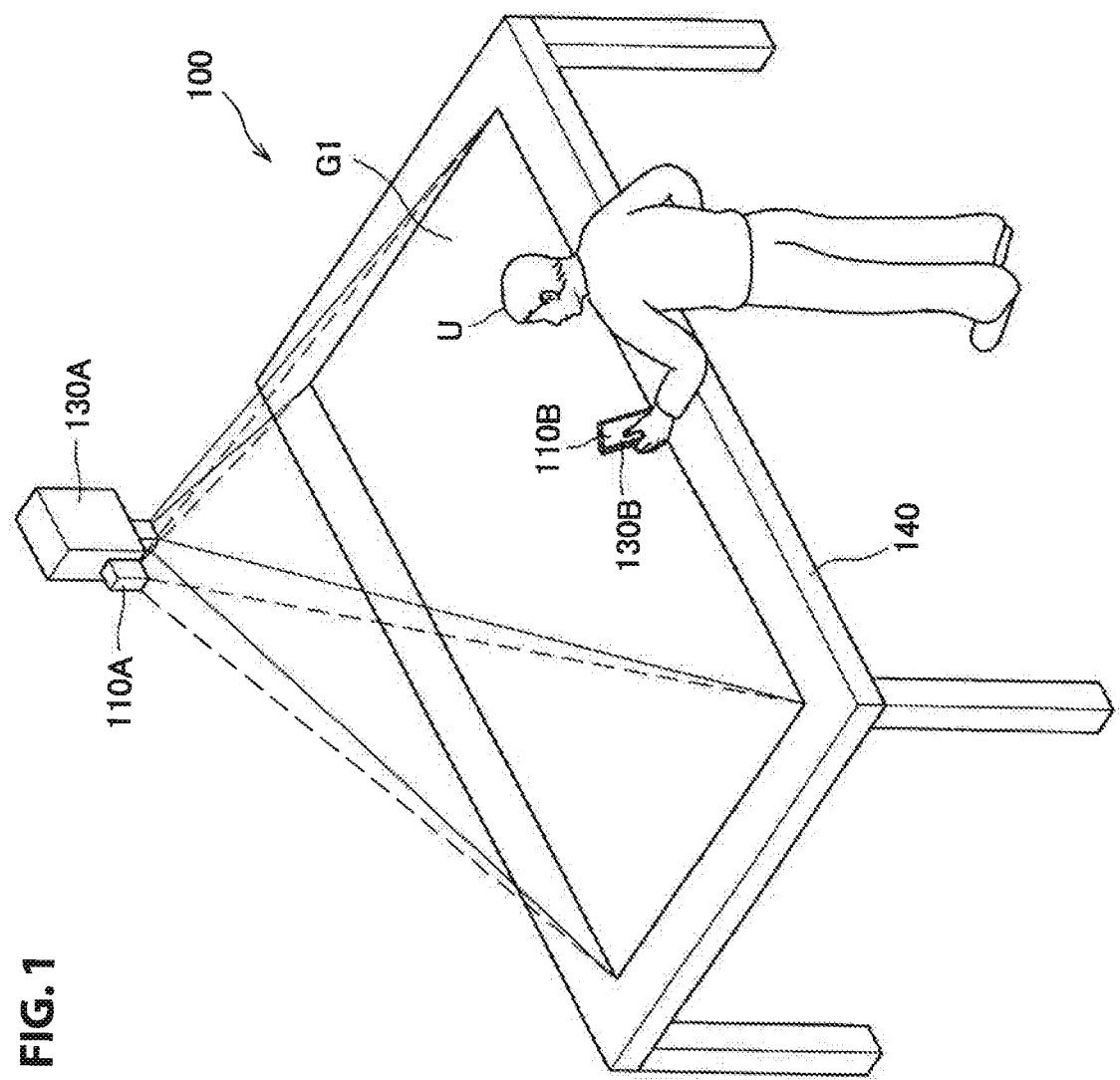
FIG. 1 is a diagram showing a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that a description is given in the following order.
1. Embodiment of the present disclosure
   1.1. System configuration example
   1.2. Functional configuration example
   1.3. Example of selecting application as operation target
   1.4. Operational example corresponding to application as operation target
   1.5. Operational example of display control device
   1.6. Hardware configuration example
2. Conclusion

1. Embodiment of the Present Disclosure

1.1. System Configuration Example

First, a description is given of a configuration example of an information processing system 100 according to an embodiment of the present disclosure with reference to the drawings. FIG. 1 is an explanatory diagram showing a configuration example of the information processing system 100 according to the embodiment of the present disclosure. As shown in FIG. 1, the information processing system 100 according to the embodiment of the present disclosure includes an input unit 110 (110A, 110B) and an output unit 130 (130A, 130B). The information processing system 100 displays various information and allows a user U (hereinafter, simply referred to as a "user") who uses the information processing system 100 to perform an operation to various information.

The input unit 110A has a function of inputting information. In the example shown in FIG. 1, the input unit 110A is hung from a ceiling above a table 140. However, a position where the input unit 110A is provided is not particularly limited. The input unit 110A may include a monocular camera or a stereo camera. Further, the input unit 110A may additionally include a microphone that absorbs a sound emitted by the user.

The output unit 130A has a function of displaying a screen G1 to the table 140. In the example shown in FIG. 1, the output unit 130A is hung from the ceiling above the table 140. However, the position where the output unit 130A is provided is not particularly limited. For example, the output unit 130A may include a projector that can project the screen G1 on the top surface of the table 140. Further, the output unit 130A may additionally include a speaker that can output a sound based on an audio signal.

Here, the number of speakers may be one or plural. For example, when the number of speakers included in the output unit 130A is plural, a speaker that outputs a sound may be selected from a plurality of speakers. Further, when the number of speakers included in the output unit 130A is one or plural, an output direction of a sound by a part or all of one or a plurality of speakers may be adjusted.

Note that, although a description is mainly given in this specification of a case where the top surface of the table 140 is a display surface of the screen G1, the display surface of the screen G1 may be other than the top surface of the table 140. For example, the display surface of the screen G1 may be a wall, a building, a floor surface, or ground. Further, when the output unit 130A has a display surface, the display surface of the screen G1 may be a display surface of the output unit 130A.

The input unit 110B has a function of inputting information. In the example shown in FIG. 1, the input unit 110B is provided in an information input terminal. However, the setting position of the input unit 110B is not limited in particular. The input unit 110B may include a touch panel that can detect a touch operation or a drag operation of the user. Alternatively, the input unit 110B may include a button that can detect a pressing operation by the user.

The output unit 130B has a function of outputting information. In the example shown in FIG. 1, the output unit 130B is provided in an information input terminal. However, the setting position of the output unit 130B is not limited in particular. For example, the output unit 130B may include a display device that can display information. Further, the output unit 130B may additionally include a speaker that can output a sound based on an audio signal.

The above description is given of the configuration example of the information processing system 100 according to the embodiment of the present disclosure.

1.2. Functional Configuration Example

Figure 2:
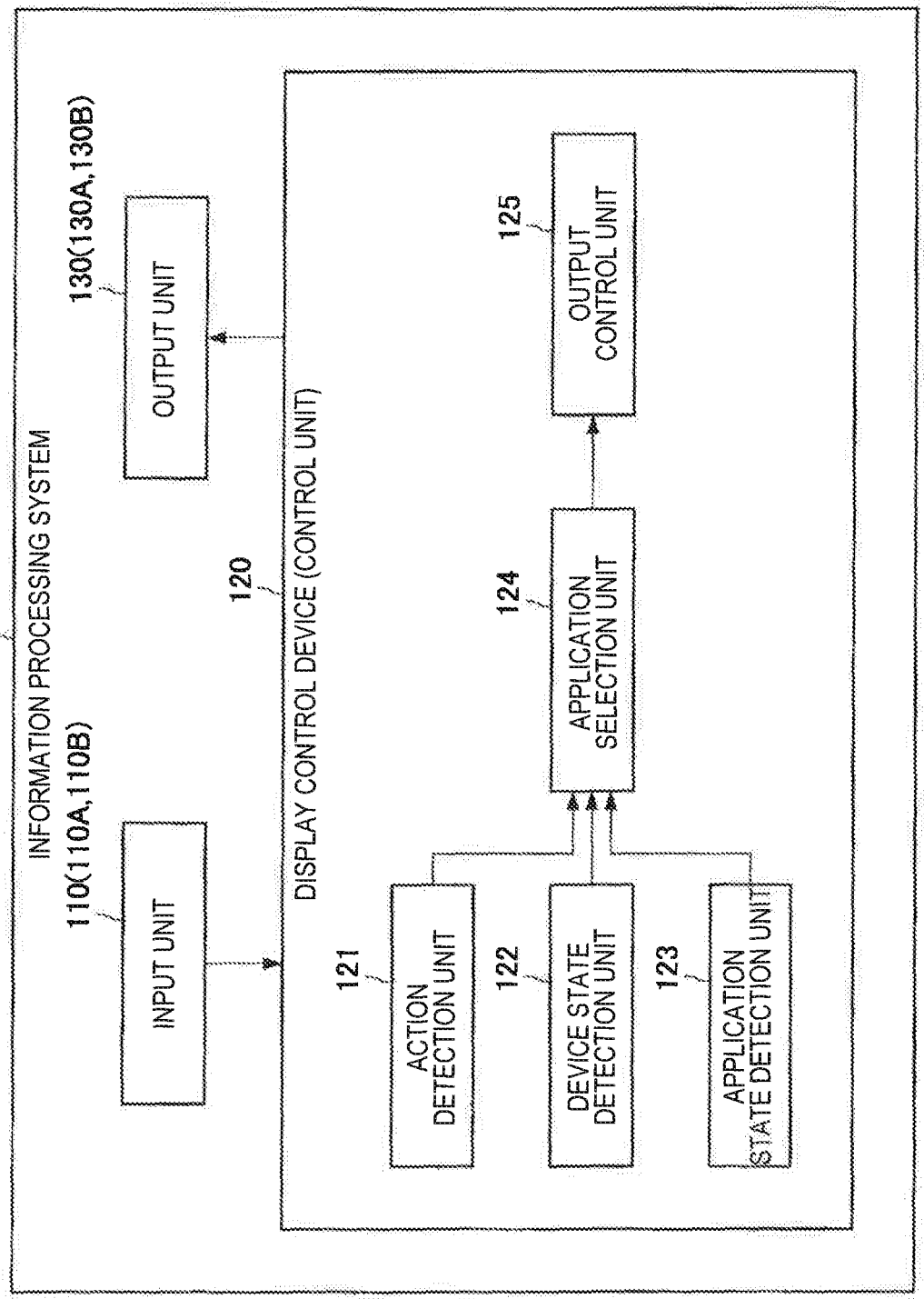
FIG. 2 is a block diagram showing a functional configuration example of the information processing system according to the embodiment.

Subsequently, a description will be given of a functional configuration example of the information processing system 100 according to the embodiment of the present disclosure. FIG. 2 is a block diagram showing a functional configuration example of the information processing system 100 according to the embodiment of the present disclosure. As shown in FIG. 2, the information processing system 100 according to the embodiment of the present disclosure includes an input unit 110 (110A, 110B), a control unit 120 (hereinafter, also referred to as a "display control device 120"), and an output unit 130 (130A, 130B).

The display control device 120 executes control of respective units in the information processing system 100. For example, the display control device 120 generates information to be output from the output unit 130. Further, the display control device 120 reflects the information input by the input unit 110 to information output from the output unit 130, for example. As shown in FIG. 2, the display control device 120 includes an action detection unit 121, a device state detection unit 122, an application state detection unit 123, an application selection unit 124, and an output control unit 125. The details of the respective functional blocks will be described later.

Note that the display control device 120 may include a central processing unit (CPU), for example. When the display control device 120 includes a device such as a CPU, the device can include an electronic circuit.

The above description is given of the functional configuration example of the information processing system 100 according to the embodiment of the present disclosure. Subsequently, a description will be given of the details of the functions of the display control device 120 according to the embodiment of the present disclosure. The output control unit 125 allows the output unit 130A to output a screen G1 under control of the display control device 120. The screen G1 may include a display object associated with one application or each of multiple applications.

The user, when having found the display object associated with the application to be operated by referring to the screen G1, points to the display object. Here, the kind of finger used for pointing is not limited in particular. Then, the action detection unit 121 detects a finger pointing direction of the user. For example, the action detection unit 121 detects the finger pointing direction from an image that is imaged by the input unit 110A.

Note that, in this specification, a description is mainly given of a case of detecting two-dimensional information indicating a direction going from the root to the end of the finger as a finger pointing direction when the action detection unit 121 detects finger touch to the table 140. When the input unit 110A includes a camera, the two-dimensional information may be a direction going from the root to the end of the finger reflected on the image that is imaged by the camera. Here, the finger touch to the table 140 may be detected by any method.

For example, when the input unit 110A includes a stereo camera, the action detection unit 121 may detect the finger touch to the table 140 based on depth information of the finger obtained by analyzing the image that is imaged by the stereo camera and coordinates of the finger in the image. Alternatively, when the input unit 110A includes a touch panel stacked on the table 140, the action detection unit 121 may detect the finger touch to the table 140 by detecting the finger touch with a touch panel.

Note that, the timing for detecting the finger pointing direction by the action detection unit 121 may be not at timing for detecting the finger touch to the table 140. For example, the action detection unit 121 may detect the finger pointing direction when having detected the entering of the finger to a predetermined area based on the image that is imaged by the camera. Further, the finger pointing direction may be three-dimensional information indicating the direction going from the root to the end of the finger. For example, when the input unit 110A includes a stereo camera, the action detection unit 121 may detect three-dimensional information indicating the direction going from the root to the end of the finger by analyzing the image that is imaged by the stereo camera.

When the action detection unit 121 detects the finger pointing direction, the application selection unit 124 selects an application as an operation target based on the display object associated with one application or each of multiple applications and the finger pointing direction. With the configuration, the user can easily specify the application as an operation target. Hereinafter, a detailed description will be given of an example of selecting the application as the operation target by the application selection unit 124.

1.3. Example of Selecting Application as Operation Target

Figure 3:
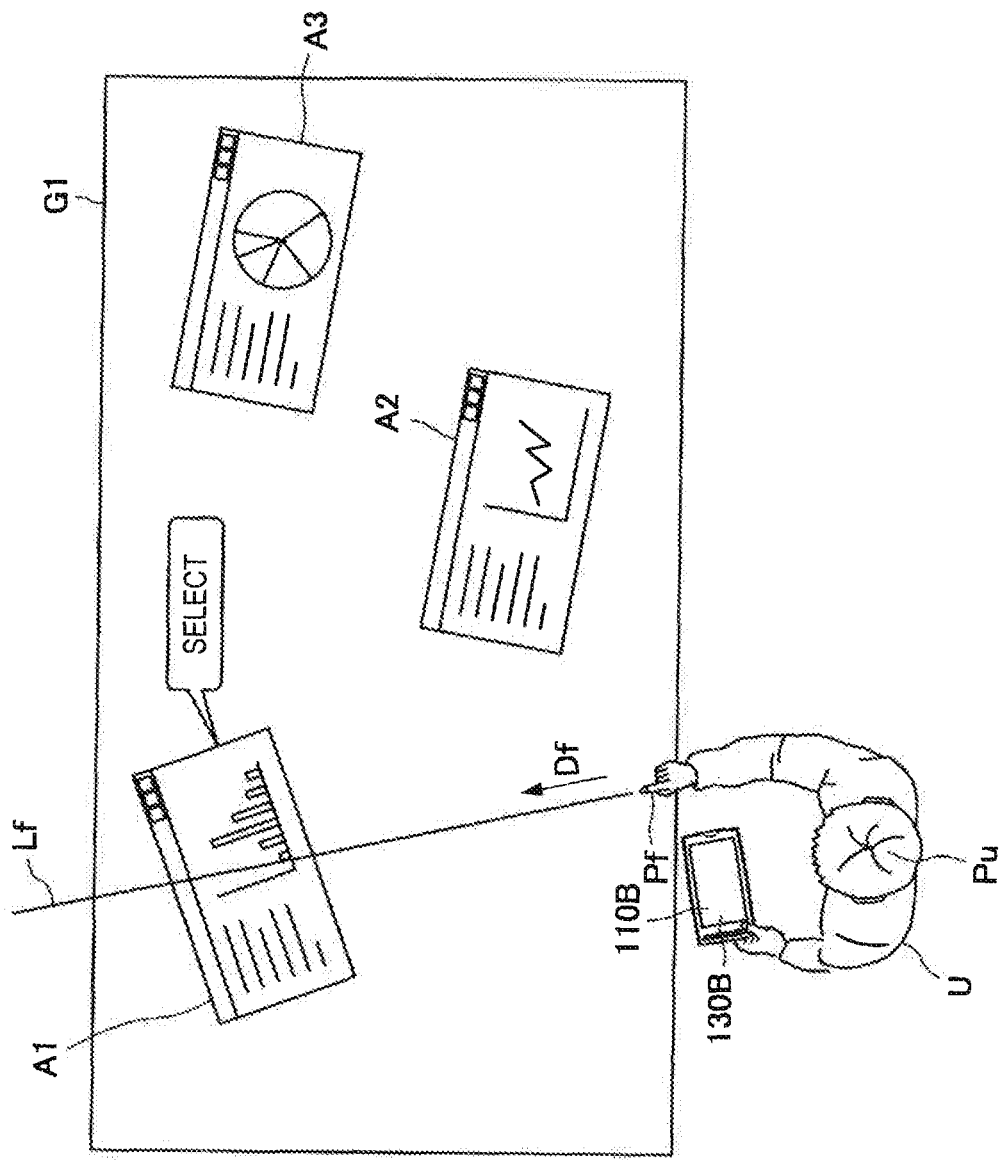
FIG. 3 is a diagram showing a first example of selecting an application as an operation target.

FIG. 3 is a diagram showing a first example of selecting the application as the operation target. Referring to FIG. 3, the output control unit 125 allows the output unit 130A to display the screen G1 including display objects A1 to A3 respectively associated with the applications, in FIG. 3, an example is given of a case where the respective display objects A1 to A3 are windows appearing on the screen G1 when executing the application. The respective display objects A1 to A3 are not limited to the windows, and may be icons or other objects. Further, the number of display objects included in the screen G1 is not particularly limited.

The positions of the respective display objects A1 to A3 on the screen G1 may be moved with a drag operation of the user U, and are stored in the display control device 120. Here, when the user U desires to operate the application associated with the display object A1, the finger may be touched to the table 140 and the display object A1 may be pointed by the finger. As a consequence, the application selection unit 124 selects, as an application as the operation target, the application associated with the display object A1 existing in a finger pointing direction Df (on a line Lf) with a finger position Pf as a reference.

With the finger position Pf as a reference as described above, the user U can intuitively specify the application as the operation target. The finger position Pf may be a position on the screen G1. For example, the application selection unit 124 may obtain the finger position Pf by analyzing the image input by the input unit 110A. FIG. 3 also shows a position Pu of the user. The position Pu of the user will be described later.

Figure 4:
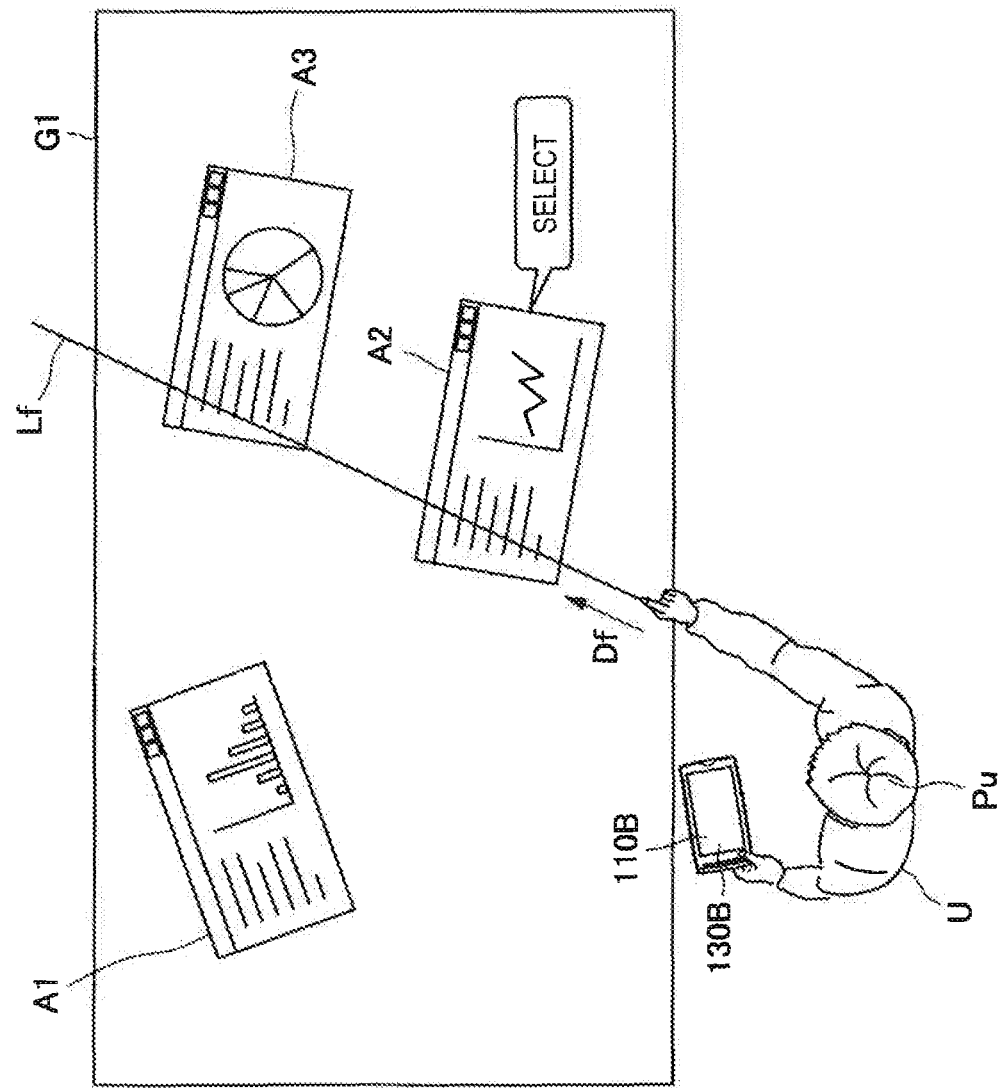
FIG. 4 is a diagram showing a second example of selecting an application as an operation target.

FIG. 4 is a diagram showing a second example of selecting the application as an operation target. Referring to FIG. 4, similarly to the example shown in FIG. 3, the output control unit 125 allows the output unit 130A to display the screen G1 including the display objects A1 to A3 respectively associated with the applications. Here, in viewpoint of the user U, the display object A2 is on the front side and the display object A3 is on the depth side.

In this case also, the finger may be touched to the table 140 and the display objects A2 and A3 may be pointed by the finger. The application selection unit 124 may select, as the application as the operation target, the application associated with the display object A2 closest to the finger position of the display objects A2 and A3 existing on the line Lf. That is because there is a high possibility that the user U wants to specify, as the application as the operation target, the application associated with the display object A2 closest to the finger position.

Figure 5:
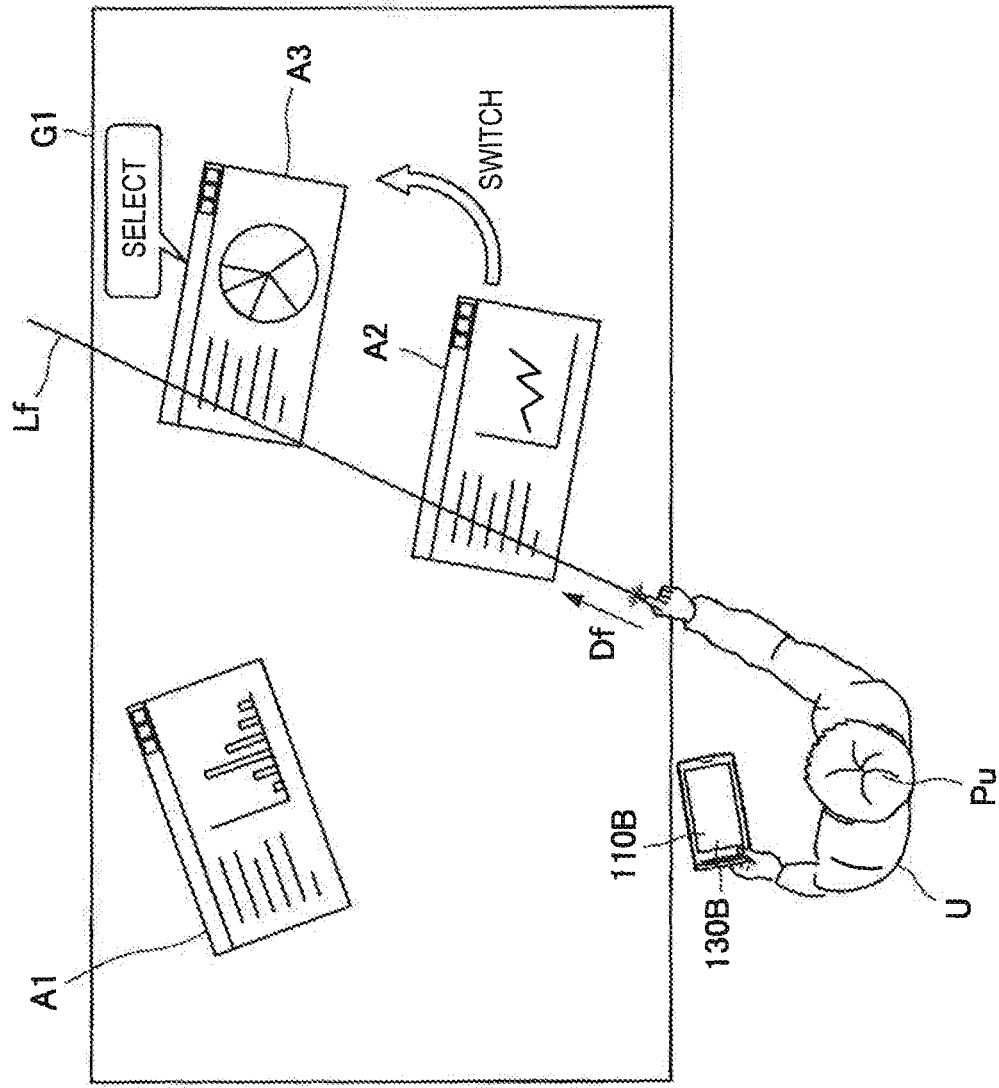
FIG. 5 is a diagram showing a third example of selecting an application as an operation target.

FIG. 5 is a diagram showing a third example of selecting the application as the operation target. Referring to FIG. 5, similarly to the example shown in FIG. 3, the output control unit 125 allows the output unit 130A to display the screen G1 including the display objects A1 to A3 respectively associated with the applications. Here, in viewpoint of the user U, the display object A2 is on the front side, and the display object A3 is on the depth side.

In this case, as shown in FIG. 4, the application selection unit 124 may select, as the application as the operation target, the application associated with the display object A2 closest to the finger position of the display objects A2 and A3 existing on the line Lf. However, the user U may want to switch the application as the operation target to the application associated with the display object A3.

In this case also, the user U may detach the finger from the table 140 once, touch the table 140 with the finger again, and point the display objects A2 and A3 with the finger. As a consequence, the application selection unit 124 switches the application as the operation target to the application associated with the display object A3 existing in the finger pointing direction Df (on the line Lf with the finger position as a reference. Note that the operation for switching the application as the operation target is not limited to the example.

In the above-shown example, the description is given of the example of selecting the application as the operation target by the application selection unit 124, irrespective of the states of the applications respectively associated with the display objects A1 to A3. However, when selecting the application as the operation target by the application selection unit 124, the application states respectively associated with the display objects A1 to A3 may be considered.

Specifically, the application state detection unit 123 may detect states of the respective display objects A1 to A3 as the application states, and the application selection unit 124 may select the application as the operation target based on the application states. The application state is not limited in particular, and may be information indicating whether or not the operation to the application is necessary. Hereinafter, the example will be described.

Figure 6:
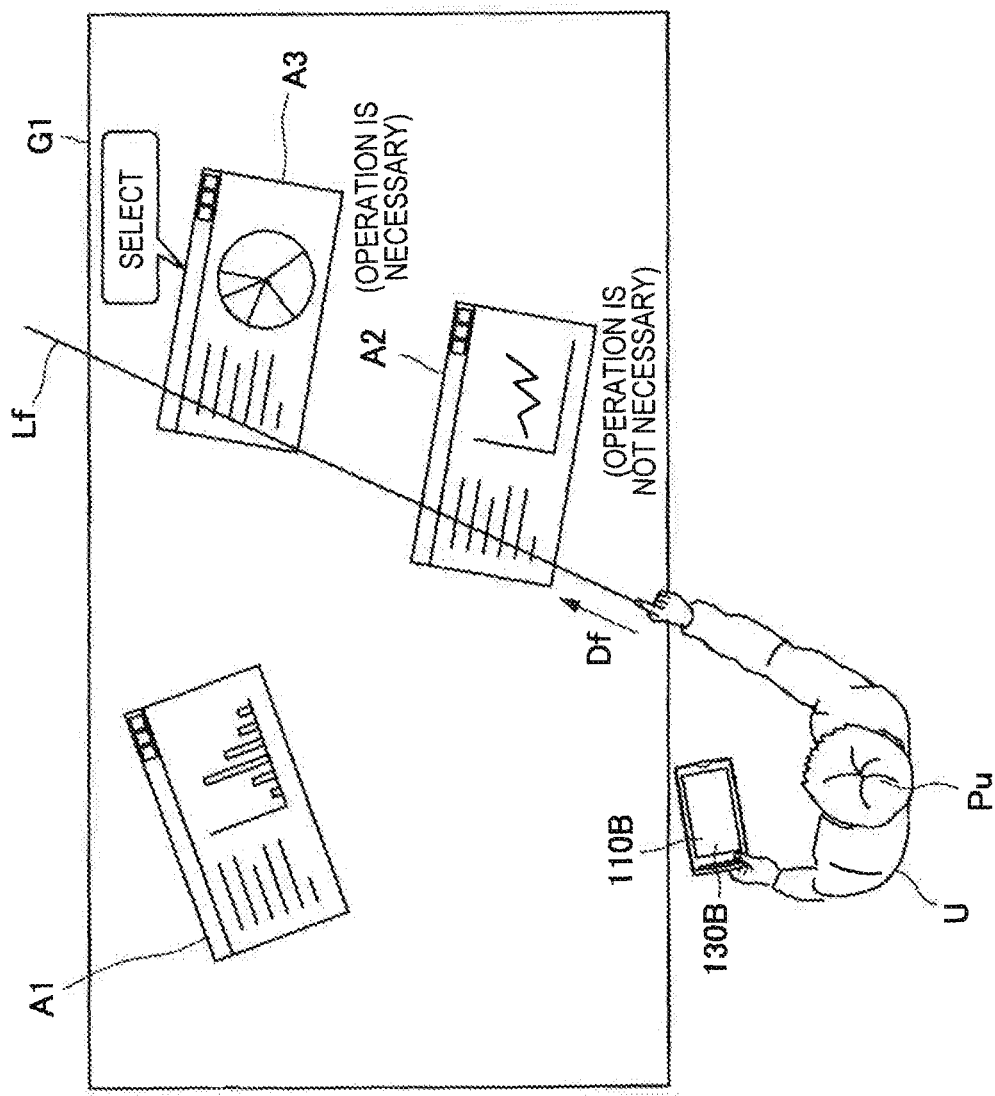
FIG. 6 is a diagram showing a fourth example of selecting an application as an operation target.

FIG. 6 is a diagram showing a fourth example of selecting the application as the operation target. Referring to FIG. 6, similarly to the example shown in FIG. 3, the output control unit 125 allows the output unit 130A to display the screen G1 including the display objects A1 to A3 respectively associated with the applications. Here, the operation to the application associated with the display object A2 is not necessary. The operation to the application associated with the display object A3 is necessary.

In this case, as shown in FIG. 6, the display objects A2 and A3 exist on the line Lf. The application selection unit 124 may not select the application associated with the display object A2 as the application as the operation target because the operation to the application associated with the display object A2 is not necessary. That is because the application that may not require the operation does not need to be selected as the application as the operation target.

On the other hand, the application selection unit 124 may select, as the application as the operation target, the application associated with the display object A3 because the operation to the application associated with the display object A3 is necessary. That is because the application that requires the operation needs to be selected as the application as the operation target.

Note that, although as the application state, the example is given here as the information indicating whether or not the operation to the application is necessary, the application state is not particularly limited. For example, the application state may include at least any one of a time when the operation to the application becomes necessary, an elapsed time from the execution start of the application, an elapsed time after the final operation to the application, and a distance between the uses and the display object associated with the application, in addition to the information indicating whether or not the operation to the application is necessary. For example, the application selection unit 124 may preferentially select the application in chronological order of the time when the operation to the application became necessary. Alternatively, the application selection unit 124 may preferentially select the application with a longer elapsed time after the execution start of the operation to the application. Alternatively, the application selection unit 124 may preferentially select the application with a shorter elapsed time after the final operation to the application. Alternatively, the application selection unit 124 may preferentially select the application with a shorter distance between the user and the display object associated with the application.

In the above example, the description is given of the example of selecting the application as the operation target by the application selection unit 124, irrespective of the state of the display control device 120. However, the state of the output unit 130A may be considered for selecting the application as the operation target by the application selection unit 124.

Specifically, the device state detection unit 122 may detect the state of the display control device 120 as a device state. The application selection unit 124 may select the application as the operation target based on the device state. The device state is not limited in particular, and may be information indicating whether or not the device is connected to the network. The information indicating whether or not the device is connected to the network may be obtained from various information associated with the applications. Alternatively, it may be determined whether or not the device is connected to the network depending on whether or not a communication history via the network remains. Hereinafter, the example will be described.

Figure 7:
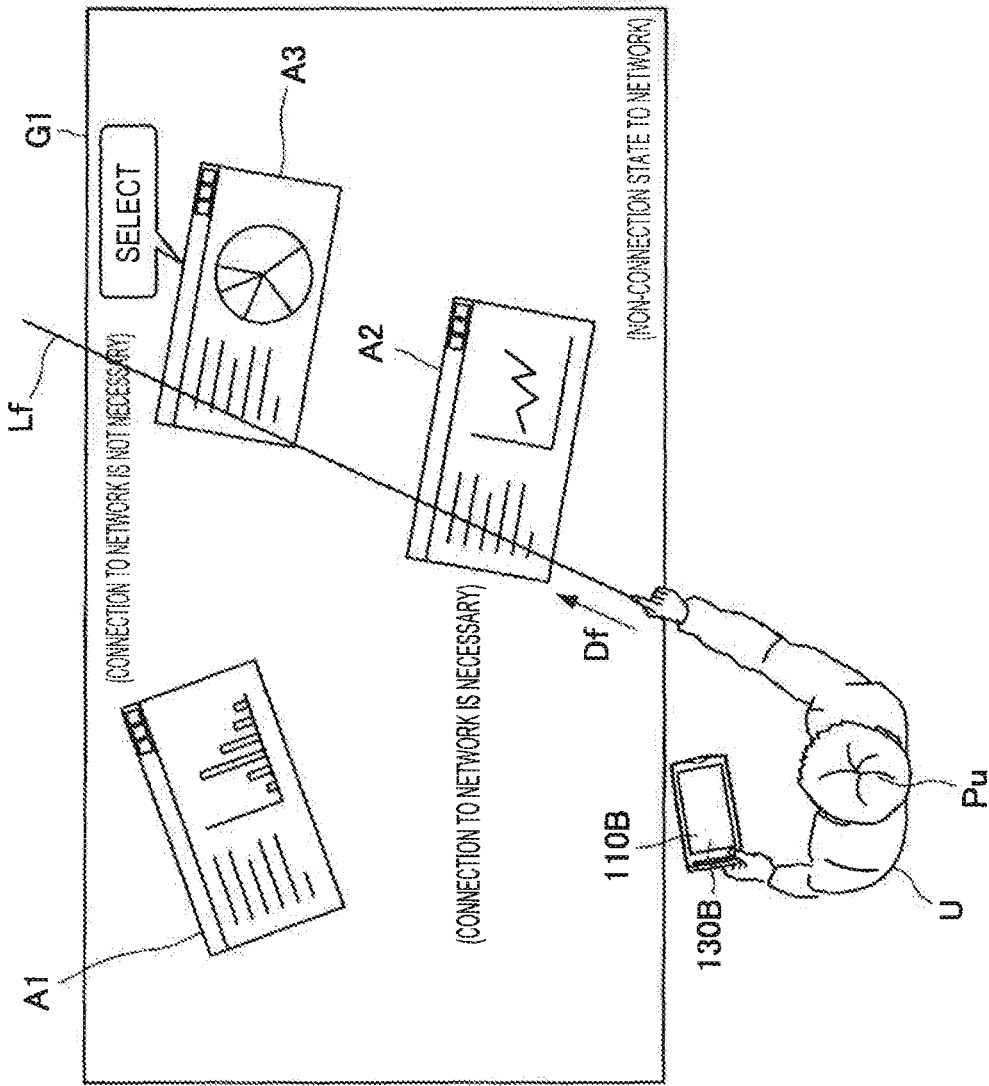
FIG. 7 is a diagram showing a fifth example of selecting an application as an operation target.

FIG. 7 is a diagram showing a fifth example of selecting the application as the operation target. Referring to FIG. 7, similarly to the example shown in FIG. 3, the output control unit 125 allows the output unit 130A to display the screen G1 including the display objects A1 to A3 respectively associated with the applications. The display control device 120 is not connected to the network, the application associated with the display object A2 requires the connection to the network, and the application associated with the display object A3 does not require the connection to the network.

In this case, as shown in FIG. 7, the display objects A2 and A3 exist on the line Lf. Since the application associated with the display object A2 requires the connection to the network, the application selection unit 124 may exclude the application associated with the display object A2 from the application as the operation target. That is because the application that requires the connection to the network does not need to be selected as the application as the operation target in a non-connection state to the network.

On the other hand, since the application associated with the display object A3 may not be connected to the network, the application selection unit 124 may select the application associated with the display object A3 as the application as the operation target. That is because the application that does not require the connection to the network needs to be selected as the application as the operation target also in the non-connection state to the network.

Note that, here, as the device state, the example is given of the information indicating whether or not the display control device 120 is connected to the network. However, the device state is not limited in particular.

In the above-shown example, the description is given of selecting the application associated with the display object existing in the finger pointing direction with the finger position as a reference, as the application as the operation target by the application selection unit 124. However, the application as the operation target may be specified by another operation. For example, the user may specify the application as the operation target by directing the line of sight to the application to be specified as the application as the operation target.

Specifically, the action detection unit 121 may detect the line of sight of the user U, and the application selection unit 124 may select the application associated with the display object existing on the line of sight as the application as the operation target. The line of sight of the user U may be detected by any method, or may be detected by analyzing the image input by the input unit 110A or by analyzing the image that is imaged by another camera (e.g., camera that images the eye of the user U). Hereinafter, the example will be described.

Figure 8:
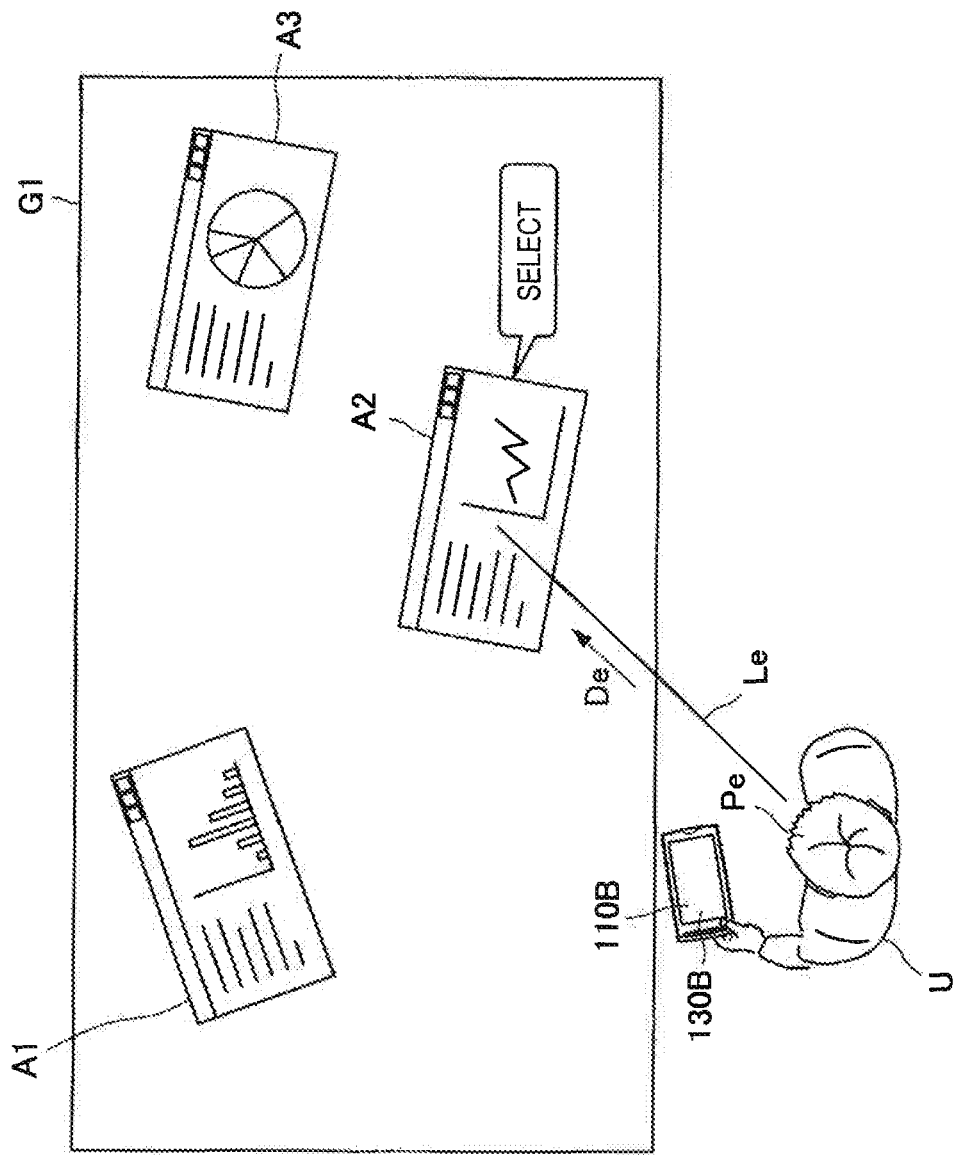
FIG. 8 is a diagram showing a sixth example of selecting an application as an operation target.

FIG. 8 is a diagram showing a sixth example of selecting the application as the operation target. Referring to FIG. 8, similarly to the example shown in FIG. 3, the output control unit 125 allows the output unit 130A to display the screen G1 including the display objects A1 to A3 respectively associated with the applications. The display control device 120 preliminarily stores a three-dimensional position of the screen G1, positions of the respective display objects A1 to A3 on the screen G1, and a three-dimensional position Pe of the eye.

Here, the user U, when desiring to operate the application associated with the display object A2, may direct the line of sight to the display object A2. As a consequence, the application selection unit 124 can select, as the application as the operation target, the application associated with the display object A2 existing in a three-dimensional line-of-sight direction De (on the line Le) with the three-dimensional position Pe of the eye as a reference. Using the line of sight in this way makes it possible to intuitively specify the application as the operation target.

Further, an operation other than the user operation for directing the line of sight may specify the application as the operation target. The user may specify the application as the operation target by emitting a voice indicating information (hereinafter, simply referred to as "application identification information") for identifying the application to be specified as the application as the operation target. The voice emitted from the user may be input by the input unit 110A. The example will be given below.

Figure 9:
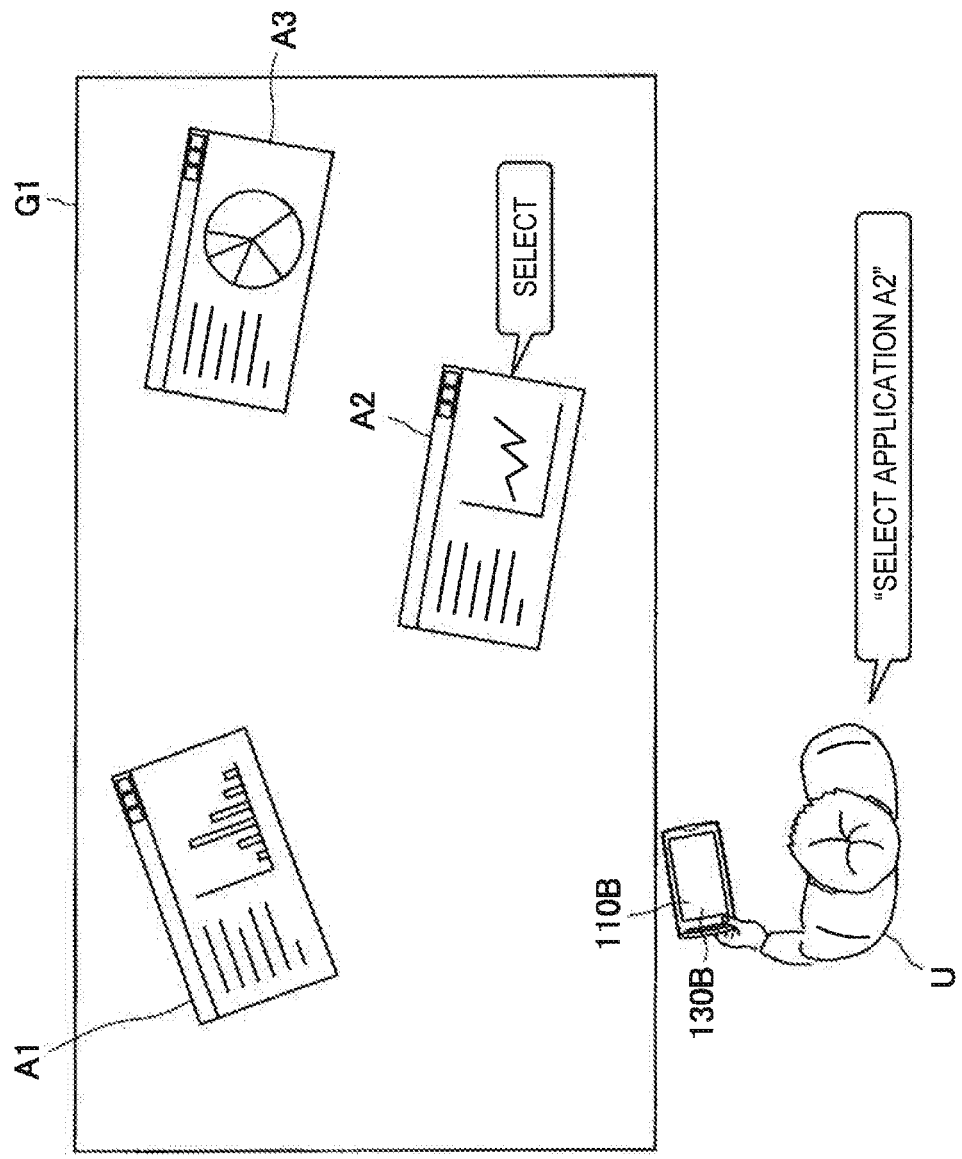
FIG. 9 is a diagram showing a seventh example of selecting an application as an operation target.

FIG. 9 is a diagram showing a seventh example of selecting the application as the operation target. Referring to FIG. 9, similarly to the example shown in FIG. 3, the output control unit 125 allows the output unit 130A to display the screen G1 including the display objects A1 to A3 respectively associated with the applications. Further, the display control device 120 preliminarily stores information for identifying the applications respectively associated with the display objects A1 to A3.

Here, the user U, when desiring to operate the application associated with the display object A2, may emit the voice indicating the information for identifying the application. As a result, the action detection unit 121 can detect a character string from the voice emitted from the user U, and the application selection unit 124 can select, as the application as the operation target, the application identified by the application identification information matching or similar to the character string by comparing the character string with the stored application identification information.

As mentioned above, using the voice emitted from the user U makes it possible to intuitively specify the application as the operation target. Note that the voice emitted from the user U may be the application identification information itself. However, as shown in FIG. 9, the voice obtained by adding a predetermined phrase to the ending of the application identification information may be used. Alternatively, the voice emitted from the user U may be the voice obtained by adding a predetermined phrase to the head of the application identification information.

1.4. Operational Example Corresponding to Application as Operation Target

As mentioned above, the application selection unit 124 can select the application as the operation target. When the application as the operation target is selected, the output control unit 125 controls the output unit 130 to execute a predetermined operation corresponding to the application as the operation target. The operation corresponding to the application as the operation target is not limited in particular. Hereinafter, an example is given of the operation corresponding to the application as the operation target.

Figure 10:
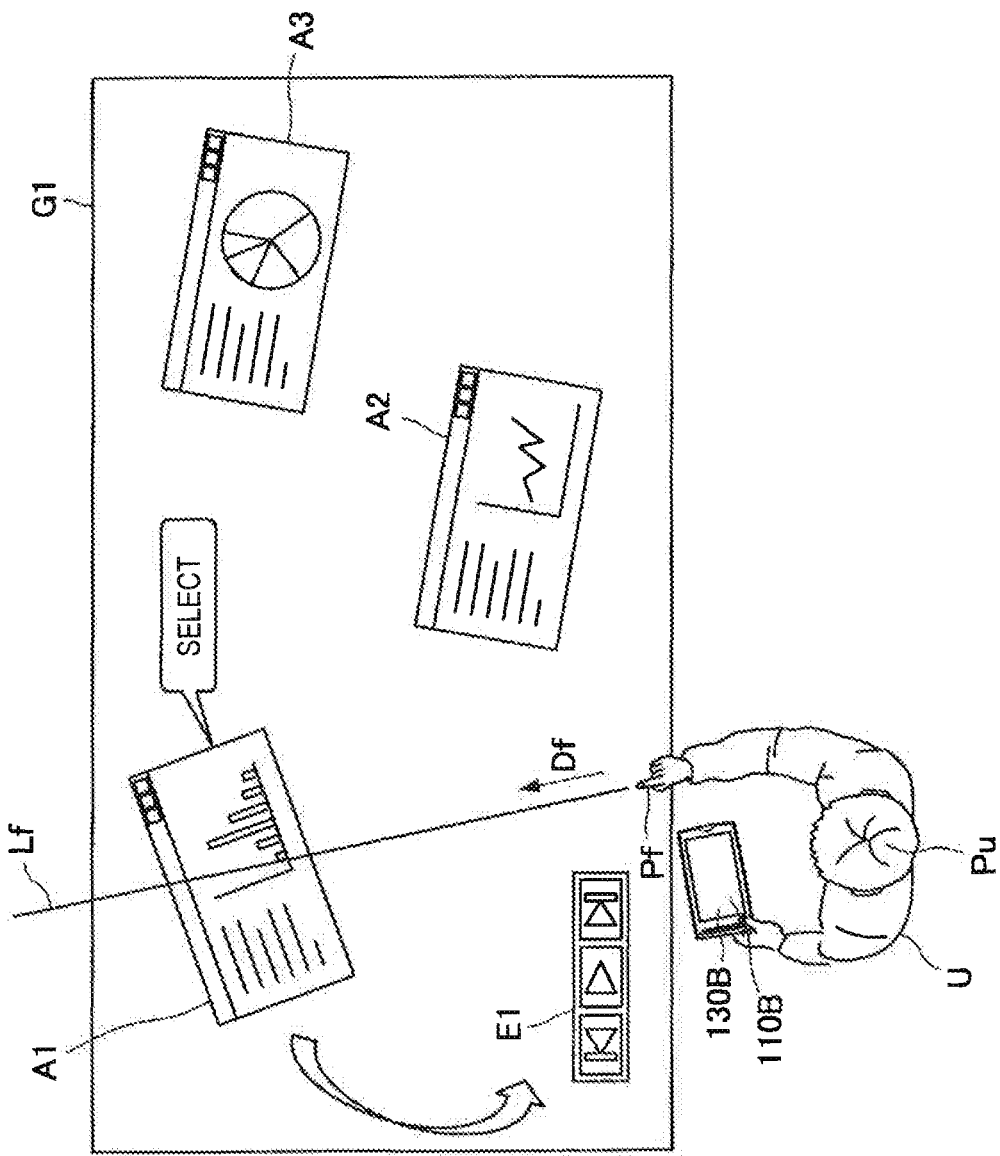
FIG. 10 is a diagram showing a first example of an operation corresponding to an application as an operation target.

FIG. 10 is a diagram showing a first example of an operation corresponding to the application as the operation target. Referring to FIG. 10, similarly to the example shown in FIG. 3, the output control unit 125 allows the output unit 130A to display the screen G1 including the display objects A1 to A3 respectively associated with the applications. Further, an operation object for operating the application is associated with the applications associated with the respective display objects A1 to A3.

Here, as shown in FIG. 10, it is assumed that the application selection unit 124 selects the application associated with the display object A1 as the application as the operation target. In this case, the output control unit 125 may control the output unit 130A to display an operation object E1 associated with the application as the operation target. As a result, it is possible to operate the application as the operation target with the operation to the displayed operation object E1. For example, when the application as the operation target is an application for reproducing contents, the operation to the application as the operation target may be the start of reproducing the contents, an operation for reproducing next contents, or an operation for reproducing the previous contents.

The position of the operation object E1 is not limited in particular. However, the operation object E1 may be preferably displayed in an area that can be easily operated by the user. Therefore, the output control unit 125 may control the output unit 130A so that operation object E1 is displayed at the position corresponding to the position Pu of the user. More specifically, the output control unit 125 may control the output unit 130A so that the operation object E1 is displayed at a position closest to the position Pu of the user in the screen G1.

Note that the position Pu of the user may be obtained by any method. For example, the output control unit 125 may obtain the position Pu of the user by analyzing the image input by the input unit 110A. The position Pu of the user may be the whole or a part (e.g., face, or eye) of body of the user U. Further, each of the position Pu of the user and the position of the screen G1 may be a two-dimensional position or a three-dimensional position.

Further, the operation object E1 may be preferably displayed to the area that is easily operated by the user as mentioned above. However, the position of the operation object E1 is not limited to the screen G1. For example, the output unit 130 may exist separately in a plurality of devices, such as in the output unit 130A and the output unit 130B. In this case, the output control unit 125 may control the device to display the operation object E1 on a device corresponding to the position Pu of the user. Hereinafter, the example will be described.

Figure 11:
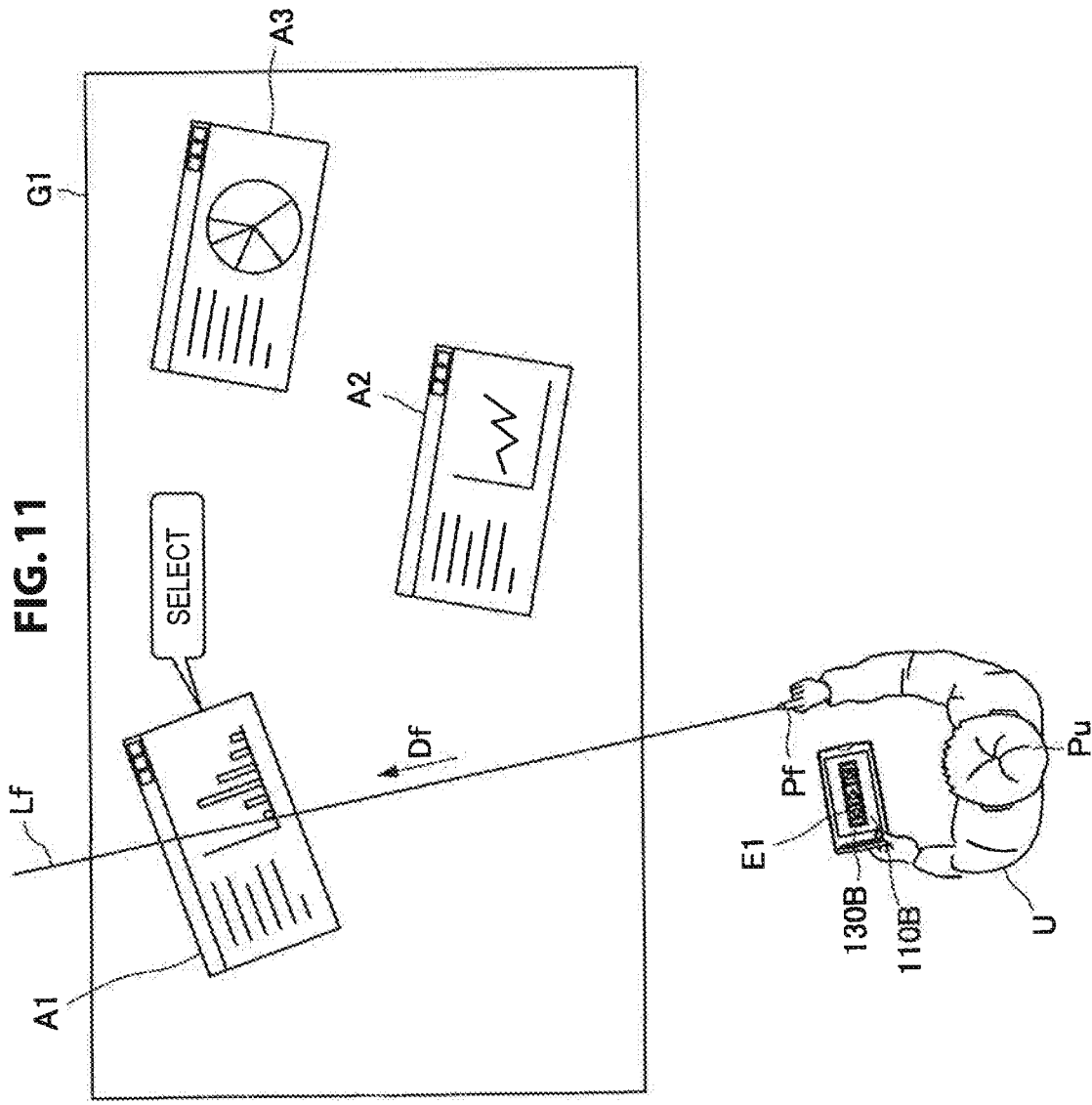
FIG. 11 is a diagram showing a second example of an operation corresponding to an application as an operation target.

FIG. 11 shows a second example of the operation corresponding to the application as the operation target. Referring to FIG. 11, similarly to the example shown in FIG. 3, the output control unit 125 allows the output unit 130A to display the screen G1 including the display objects A1 to A3 respectively associated with the applications. Further, the operation objects for operating the applications are associated with the applications respectively associated with the display objects A1 to A3.

Further, the display control device 120 stores a two-dimensional position or a three-dimensional position of each of the output units 130A and 130B. For example, the position of the output unit 130B that may move may be properly obtained and updated by the display control device 120. The position of the output unit 130B may be detected, for example, by a global positioning system (GPS) sensor that is mounted on an information input apparatus and, however, may be detected by any method.

Here, as shown in FIG. 11, such a case is assumed of selecting the application associated with the display object A1 as the application as the operation target by the application selection unit 124. In the case, the output control unit 125 may calculate distances to the output units 130A and 130B from the position Pu of the user. Further, the output control unit 125 may control the output unit 130 so that the operation object E1 is displayed on the output unit 130 with a shorter distance from the position Pu of the user. The position Pu of the user may be a two-dimensional position or a three-dimensional position.

In an example shown in FIG. 11, the output control unit 125 determines that the distance from the position Pu of the user to the output unit 130B is shorter than the distance from the position Pu of the user to the output unit 130A. Therefore, the output control unit 125 controls the output unit 130 so that the operation object E1 is displayed on the output unit 130B having the distance to the position Pu of the user to be determined to be shorter.

The above-shown example is described of the case where the output control unit 125 allows the execution of the operation corresponding to the application as the operation target, irrespective of a state of the input unit 110. However, in the execution of the operation by the output control unit 125, the state of the input unit 110 may be considered.

Specifically, the device state detection unit 122 may detect the state of the input unit 110 as a device state, and the output control unit 125 may control the position of the operation project E1 based on the device state. Although the device state is not limited in particular, the device state may be information indicating whether or not it can receive the operation. For example, a state of disabling operation reception means a state in which a certain event under which the operation may not be received happens, e.g., a busy state corresponding thereto. A state of enabling the operation reception means a state in which any event of disabling the operation reception does not happen. Hereinafter, the example will be described.

Figure 12:
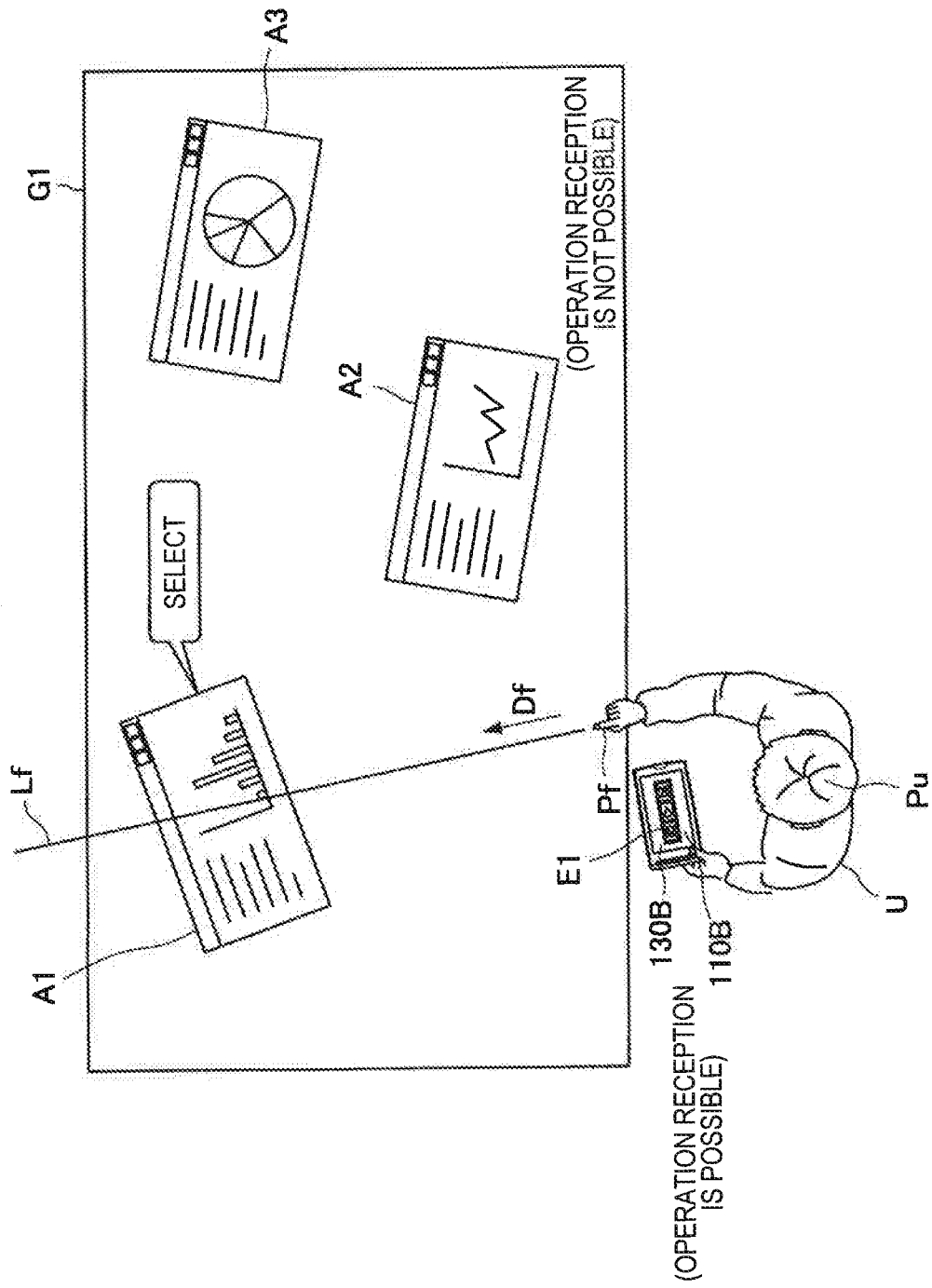
FIG. 12 is a diagram showing a third example of an operation corresponding to an application as an operation target.

FIG. 12 is a diagram showing a third example corresponding to the application as the operation target. Referring to FIG. 12, similarly to the example shown in FIG. 3, the output control unit 125 allows the output unit 130A to display the screen G1 including the display objects A1 to A3 respectively associated with the applications. Further, operation objects for operating the applications are associated with the applications respectively associated with the display objects A1 to A3.

Here, as shown in FIG. 12, such a case is assumed of selecting the application associated with the display object A1 as the application as the operation target by the application selection unit 124. In this case, the device state detection unit 122 detects whether or not the respective input units 110A and 110B can receive the operation. In the example shown in FIG. 12, the output control unit 125 determines that the input unit 110A cannot receive the operation, and the input unit 110B can receive the operation.

In this case, the output control unit 125 may control the output unit 130B corresponding to the input unit 110B that can receive the operation to allow the output unit 130E to display the operation object E1. On the other hand, the output control unit 125 may control the output unit 130A corresponding to the input unit 110A that cannot receive the operation to allow the output unit 130A not to display the operation object E1.

In the above-shown example, the description is given of the operation for displaying the operation object E1 associated with the application as the operation target, as an example of the operation corresponding to the application as the operation target. However, the operation corresponding to the application as the operation target is not limited to the operation. For example, the output control unit 125 may control the output unit 130A to move the display object associated with the application as the operation target to a position corresponding to the position Pu of the user. As a result, it is possible to easily perform the operation to the application as the operation target on the display object. Hereinafter, the example will be described.

Figure 13:
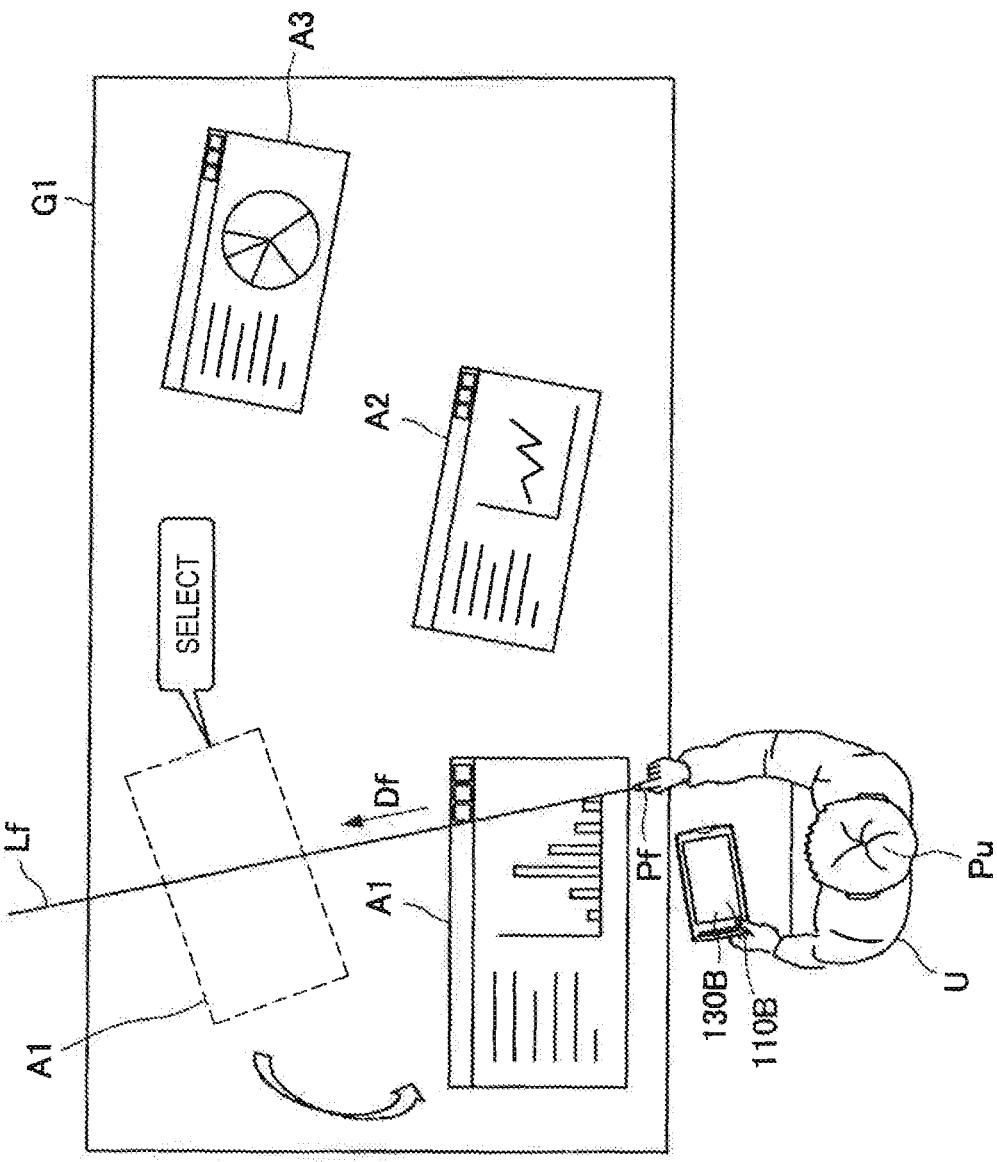
FIG. 13 is a diagram showing a fourth example of an operation corresponding to an application as an operation target.

FIG. 13 is a diagram showing a fourth example of the operation corresponding to the application as the operation target. Referring to FIG. 13, similarly to the example shown in FIG. 3, the output control unit 125 allows the output unit 130A to display the screen G1 including the display objects A1 to A3 respectively associated with the applications. Further, operation objects for operating the applications are associated with the applications respectively associated with the display objects A1 to A3.

Here, as shown in FIG. 13, such a case is assumed of selecting the application associated with the display object A1 as the application as the operation target by the application selection unit 124. In this case, the output control unit 125 may control the output unit 130A to move the display object A1 to a position closest to the position Pu of the user on the screen G1. As a consequence, it is possible to easily perform an operation to the application as the operation target on the display object A1.

1.5. Operational Example of Display Control Device

Figure 14:
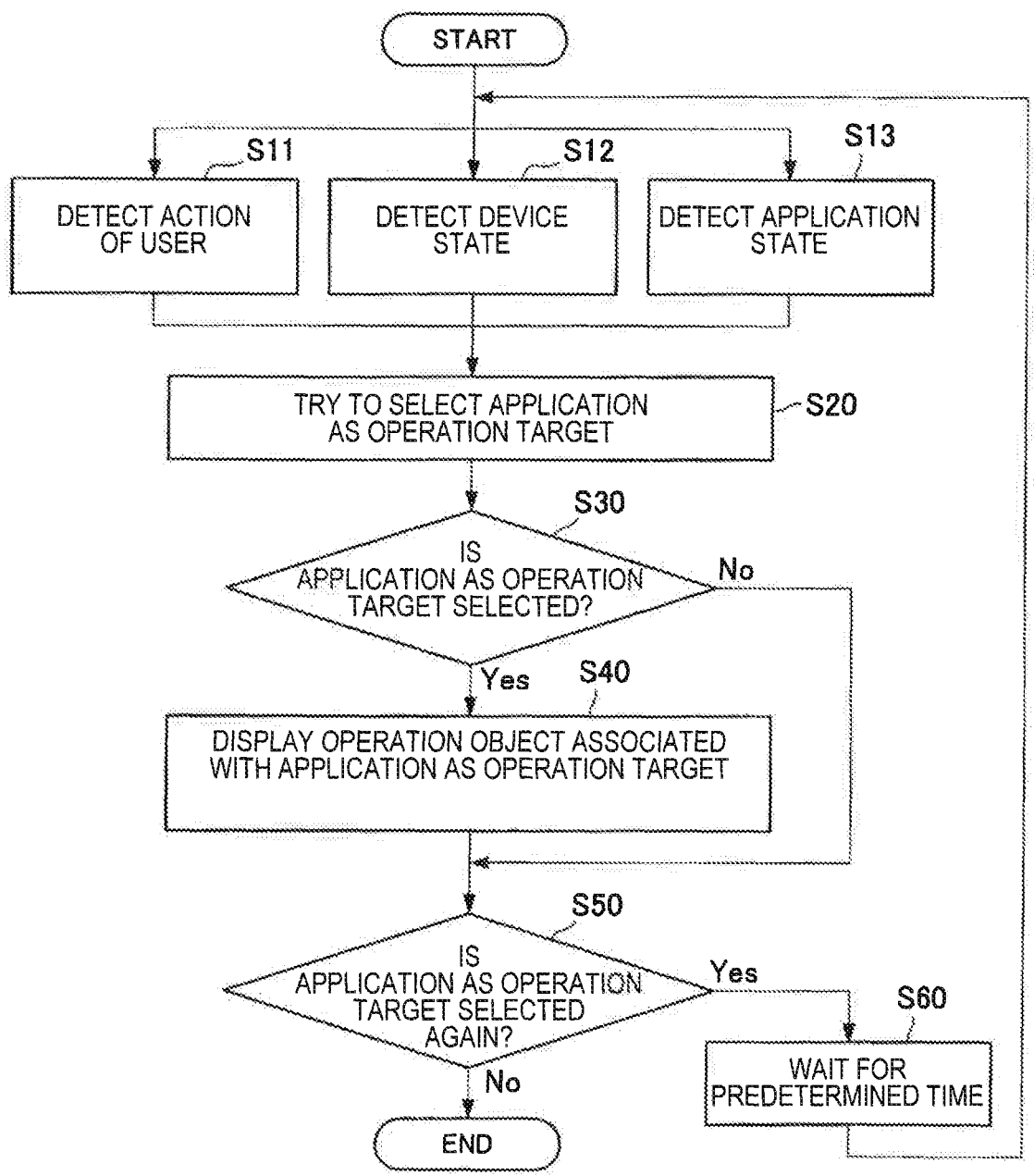
FIG. 14 is a flowchart showing an example of an operation of a display control device according to an embodiment of the present disclosure.

The above description is given of the example of the operation corresponding to the application as the operation target. Subsequently, a description will be given of an operational example of the display control device 120 according to an embodiment of the present disclosure. FIG. 14 is a flowchart showing an example of the operation of the display control device 120 according to the embodiment of the present disclosure. The operational example shown in FIG. 14 is only an example of the operation of the display control device 120 according to the embodiment of the present disclosure. Therefore, the operation of the display control device 120 according to the embodiment of the present disclosure is not limited to the operational example shown in FIG. 14.

The action detection unit 121 detects an action of the user (S11). Further, the device state detection unit 122 detects the device state (S12). Furthermore, the application state detection unit 123 detects the application state (S13). Subsequently, the application selection unit 124 tries to select the application as the operation target based on the action of the user, the device state, and the application state (S20).

Note that, FIG. 14 shows an example in which the application selection unit 124 selects the application as the operation target based on detection results of all of the action detection unit 121, the device state detection unit 122, and the application state detection unit 123. However, the application selection unit 124 may select the application as the operation target based on a part of the detection results of the action detection unit 121, the device state detection unit 122, and the application state detection unit 123.

Subsequently, if the application as the operation target is selected ("Yes" in S30), the output control unit 125 allows the operation object associated with the application as the operation target to be displayed (S40). Note that, although FIG. 14 shows an operation for displaying the operation object as an example of the operation corresponding to the application as the operation target, the operation corresponding to the application as the operation target is not limited to the operation for displaying the operation object. On the other hand, if the application as the operation target is not selected ("No" in S30), the output control unit 125 shifts the operation to S50.

Subsequently, if the application as the operation target is selected again ("Yes" in S50), the output control unit 125 waits for a predetermined time (S60), and thereafter shifts the operation to S11 to S13. On the other hand, if the application as the operation target is not selected again ("No" in S50), the output control unit 125 ends the operation.

The above description is given of the operational example of the display control device 120 according to the embodiment of the present disclosure.

1.6. Hardware Configuration Example

Figure 15:
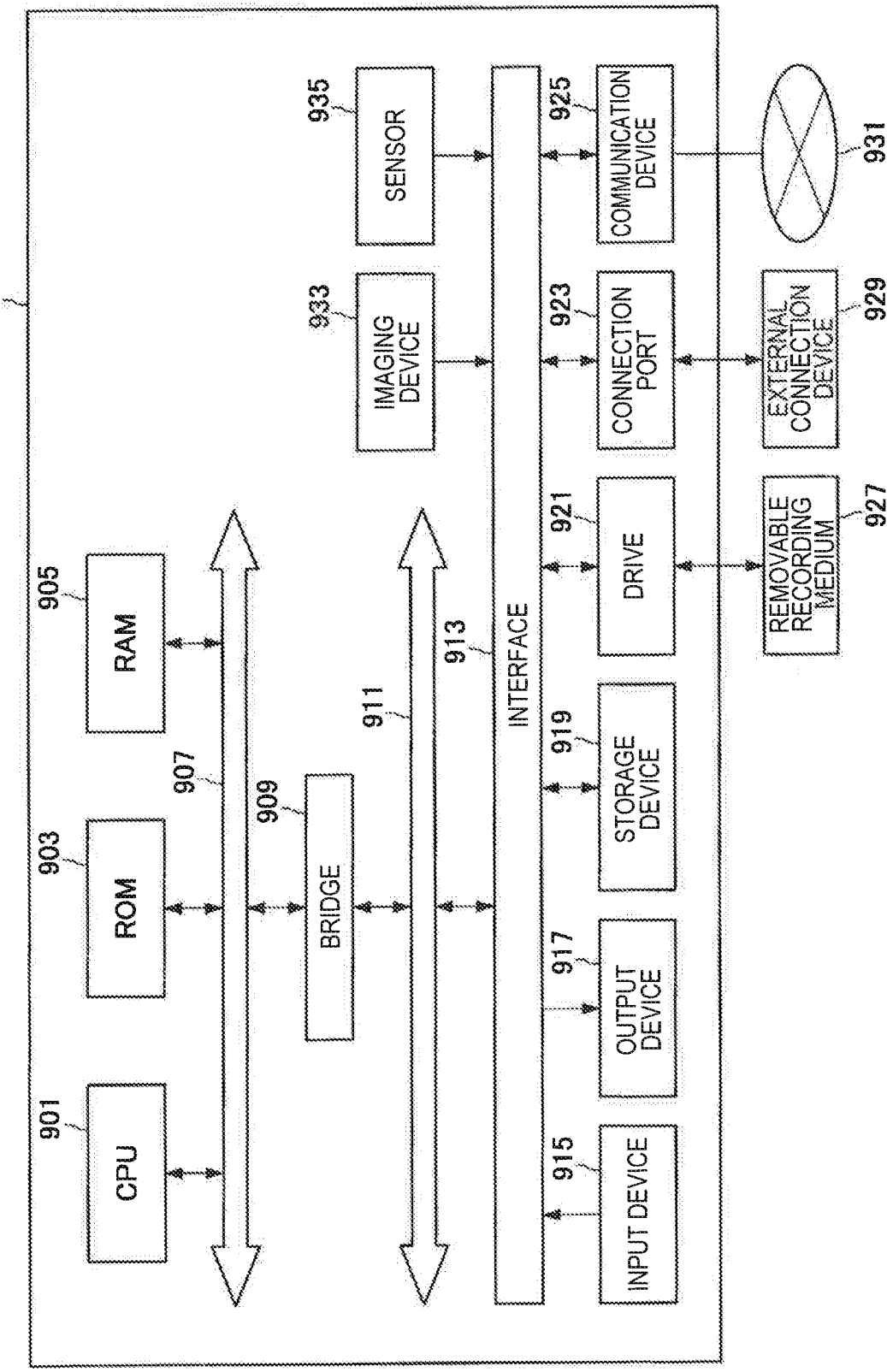
FIG. 15 is a block diagram showing a hardware configuration example of the information processing system according to the embodiment.

Next, a hardware configuration of the information processing system 100 according to an embodiment of the present disclosure will be described with reference to FIG. 15. FIG. 15 is a block diagram illustrating a hardware configuration example of the information processing system 100 according to the embodiment of the present disclosure.

As illustrated in FIG. 15, the information processing system 100 includes a central processing unit (CPU) 901, a read only memory (ROM) 903, and a random access memory (RAM) 905. In addition, the information processing system 100 may include a host bus 907, a bridge 909, an external bus 911, an interface 913, an input device 915, an output device 917, a storage device 919, a drive 921, a connection port 923, and a communication device 925. Further, the information processing system 100 may include an imaging device 933 and a sensor 935 as necessary. The information processing system 100 may include a processing circuit such as a digital signal processor (DSP) or application specific integrated circuit (ASIC), alternatively or in addition to the CPU 901.

The CPU 901 serves as an operation processor and a control device, and controls all or some operations in the information processing system 100 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touch panel, buttons, switches and a lever. The input device 915 may include a mic that detects a sound of a user. The input device 915 may be, for example, a remote control unit using infrared light or other radio waves, or may be an external connection device 929 such as a portable phone operable in response to the operation of the information processing system 100. Furthermore, the input device 915 includes an input control circuit which generates an input signal on the basis of the information which is input by a user and outputs the input signal to the CPU 901. By operating the input device 915, a user can input various types of data to the information processing system 100 or issue instructions for causing the information processing system 100 to perform a processing operation. Moreover, an imaging device 933, which will be described later, images a motion of the hand of the user, the finger of the user, or the like, thereby functioning as an input device. At this time, a pointing position may be determined depending on the motion of the hand or the direction of the finger.

The output device 917 includes a device capable of visually or audibly notifying the user of acquired information. The output device 917 may include a display device such as a liquid crystal display (LCD), a plasma display panel (PDP), an organic electro-luminescence (EL) displays, and a projector, a hologram display device, an audio output device such as, a speaker or a headphone, and a peripheral device such as a printer. The output device 917 may output the results obtained from the process of the information processing system 100 in a form of a video such as text or an image, and an audio such as voice or sound. The output device 917 may include a light or the like to brighten surroundings.

The storage device 919 is a device for data storage which is configured as an example of a storage unit of the information processing system 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing system 100 or attached externally thereto. The drive 921 reads information recorded in the removable recording medium 927 attached thereto, and outputs the read information to the RAM 905. Further, the drive 921 writes a record in the removable recording medium 927 attached thereto.

The connection port 923 is a port used to directly connect devices to the information processing system 100. The connection port 923 may include a universal serial bus (USB) port, an IEEE1394 port, and a small computer system interface (SCSI) port. The connection port 923 may further include an RS-232C port, an optical audio terminal, a high-definition multimedia interface (HDMI) port, and so on. The connection of the external connection device 929 to the connection port 923 makes it possible to exchange various data between the information processing system 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB) or the like. In addition, the communication device 925 may be a router for optical communication, a router for asymmetric digital subscriber line (ADSL), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing system 100, such as the orientation of the case of the information processing system 100, as well as information regarding the environment surrounding the information processing system 100, such as the brightness or noise surrounding the information processing system 100, for example. The sensor 935 may also include a global positioning system (GPS) sensor that receives GPS signals and measures the latitude, longitude, and altitude of the apparatus.

The foregoing thus illustrates an exemplary hardware configuration of the information processing system 100. Each of the above components may be realized using general-purpose members, but may also be realized in hardware specialized in the function of each component. Such a configuration may also be modified as appropriate according to the technological level at the time of the implementation.

2. Conclusion

As mentioned above, according to the embodiment of the present disclosure, there is provided the display control device 120 including the output control unit 125 configured to control the output unit 130 to display the display object associated with one application or each of multiple applications, the action detection unit 121 configured to detect a finger pointing direction of the user, and the application selection unit 124 configured to select the application as the operation target based on the finger pointing direction and the display object associated with the one application or each of the multiple applications. According to such a configuration, the user can easily specify the application as the operation target.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the description is given of the example of the operation corresponding to the application as the operation target, the operation corresponding to the application as the operation target is not limited to the foregoing. For example, if the application as the operation target is an application for reproducing contents, the operation corresponding to the application as the operation target may be an operation for starting contents during stopping the reproduction of the contents or an operation for stopping the contents during reproducing the contents. Alternatively, the operation corresponding to the application as the operation target may be an operation for enlarging or reducing the display object.

Further, although the above example is described of the device state, the device state is not limited to the foregoing. For example, the device state may indicate a position where the display object exists. In this case, the output control unit 125 may control the output unit 130A to display the operation object at least at a position where the display object does not exist. As a consequence, it is possible to prevent the overlapping between the display object and the operation object.

Moreover, it is possible to create a program for allowing hardware such as a CPU, a ROM, or a RAM included in the computer to exhibit a function equal to the function of the information processing system 100. Further, it is possible to provide a computer-readable recording medium that records the program.

Furthermore, the output control unit 125 generates display control information to allow the output unit 130 to display contents and outputs the generated display control information to the output unit 130, thereby controlling the output unit 130 to display the display contents on the output unit 130. The contents of the display control information may be properly changed depending on a system configuration.

As a specific example, a program for realizing the information processing system 100 may be a web application, hi this case, the display control information may be realized by a markup language such as a hypertext markup language (HTML), a standard generalized markup language (SGML), or an extensible markup language (XML).

Note that, when the above-mentioned operation of the information processing system 100 is realized, the position of each component is not limited in particular. As a specific example, the input unit 110, the output unit 130, and the display control device 120 may be arranged at different devices that are connected via a network. In this case, the display control device 120 may correspond to a server such as a web server or a cloud server, and the input unit 110 and the output unit 130 may correspond to clients connected to the server via a network.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A display control device including:

an output control unit configured to control an output unit so as to display a display object associated with one application or each of multiple applications;

an action detection unit configured to detect a finger pointing direction of a user; and an application selection unit configured to select an application as an operation target based on the display object associated with the one application or each of the multiple applications and the finger pointing direction.

(2)

The display control device according to (1), wherein the output control unit controls the output unit so that a predetermined operation corresponding to the application as the operation target is executed.

(3)

The display control device according to (2), wherein the output control unit controls the output unit so that an operation object associated with the application as the operation target is displayed.

(4)

The display control device according to (3), wherein the output control unit controls the output unit so that the operation object is displayed at a position corresponding to a position of the user.

(5)

The display control device according to any one of (1) to (4), wherein the application selection unit selects, as the application as the operation target, an application associated with a display object existing in the finger pointing direction with a finger position as a reference.

(6)

The display control device according to (5), wherein the application selection unit selects, as the application as the operation target, an application associated with a display object closest to the finger position of a plurality of display objects existing in the finger pointing direction with the finger position as a reference.

(7)

The display control device according to (5) or (6), wherein the application selection unit switches the application as the operation target in accordance with a predetermined operation of the user, between the plurality of display objects existing in the finger pointing direction with the finger position as a reference.

(8)

The display control device according to any one of (1) to (7), including:

a device state detection unit configured to detect a state of the display control device as a device state, wherein the application selection unit selects the application as the operation target based on the device state.

(9)

The display control device according to (8), wherein, when the device state indicates non-connection to a network, the application selection unit excludes an application that requires connection to the network from the application as the operation target.

(10)

The display control device according to (3) or (4), including:

a device state detection unit configured to detect a state of an input unit corresponding to the output unit as a device state, wherein the output control unit controls a position of the operation object based on the device state.

(11)

The display control device according to (10), wherein the input unit exists separately in a plurality of devices, and when the device state indicates whether or not the operation is receivable for every device, the output control unit controls the device so that the operation object is displayed by an output unit corresponding to a device capable of receiving the operation.

(12)

The display control device according to (10), wherein, when the device state indicates a position where a display object exists, the output control unit controls the output unit so that the operation object is displayed at least at a position where the display object does not exist.

(13)

The display control device according to any one of (1) to (12), including:

an application state detection unit configured to detect, as an application state, a state of the one application or each of the multiple applications, wherein the application selection unit selects the application as the operation target based on the application state.

(14)

The display control device according to (13), wherein the application state includes at least any one of information indicating whether or not an operation to an application is necessary, a time when the operation to the application becomes necessary, an elapsed time from execution start of the application, an elapsed time after a final operation to the application, and a distance between the user and a display object associated with the application.

(15)

The display control device according to (1), wherein the action detection unit detects a character string from a sound emitted from the user, and the application selection unit selects, as the application as the operation target, an application identified by application identification information matching or similar to the character string, (16)

The display control device according to any one of (1) to (15), wherein the action detection unit detects a line of sight of the user, and the application selection unit selects, as the application as the operation target, an application associated with a display object existing on the line of sight.

(17)

The display control device according to (3), wherein the output unit exists separately in a plurality of devices, and the output control unit controls the device so that the operation object is displayed by a device corresponding to a position of the user.

(18)

The display control device according to (2), wherein the output control unit controls the output unit so that the display object associated with the application as the operation target is moved to a position corresponding to a position of the user.

(19)

A display control method including:

controlling an output unit so as to display a display object associated with one application or each of multiple applications;

detecting a finger pointing direction of a user; and selecting an application as an operation target based on the display object associated with the one application or each of the multiple applications and the finger pointing direction.

(20)

A program for causing a computer to function as a display control device, the display control device including
an output control unit configured to control an output unit so as to display a display object associated with one application or each of multiple applications,
an action detection unit configured to detect a finger pointing direction of a user, and
an application selection unit configured to select an application as an operation target based on the display object associated with the one application or each of the multiple applications and the finger pointing direction.

REFERENCE SIGNS LIST 100 information processing system
110 (110A, 110B) input unit
120 display control device (control unit)
121 action detection unit
122 device state detection unit
123 application state detection unit
124 application selection unit
125 output control unit
130 (130A, 130B) output unit
140 table
G1 screen
A1 to A3 display object
E1 operation object

The invention claimed is:

1. A display control device comprising:
an output control unit configured to control an output unit so as to display a display object associated with one application or each of multiple applications;
an action detection unit configured to detect a finger pointing direction of a user;
an application selection unit configured to select an application as an operation target based on the display object associated with the one application or each of the multiple applications and the finger pointing direction; and
a device state detection unit configured to detect a device state of the display control device,
wherein the application selection unit selects the application as the operation target based on the device state of the display control device,
wherein, when the device state of the display control device indicates non-connection to a network, the application selection unit excludes an application that requires connection to the network from the application as the operation target, and
wherein the output control unit, the action detection unit, the application selection unit, and the device state detection unit are each implemented via at least one processor.

2. The display control device according to claim 1, wherein
the output control unit controls the output unit so that a predetermined operation corresponding to the application as the operation target is executed.

3. The display control device according to claim 2, wherein
the output control unit controls the output unit so that an operation object associated with the application as the operation target is displayed.

4. The display control device according to claim 3, wherein
the output control unit controls the output unit so that the operation object is displayed at a position corresponding to a position of the user.

5. The display control device according to claim 1, wherein
the application selection unit selects, as the application as the operation target, an application associated with a display object existing in the finger pointing direction with a finger position as a reference.

6. The display control device according to claim 5, wherein
the application selection unit selects, as the application as the operation target, an application associated with a display object closest to the finger position of a plurality of display objects existing in the finger pointing direction with the finger position as a reference.

7. The display control device according to claim 5, wherein
the application selection unit switches the application as the operation target in accordance with a predetermined operation of the user, between the plurality of display objects existing in the finger pointing direction with the finger position as a reference.

8. The display control device according to claim 3, comprising:
a device state detection unit configured to detect a device state of an input unit corresponding to the output unit, wherein the output control unit controls a position of the operation object based on the device state of the input unit, and
wherein the device state detection unit is implemented via at least one processor.

9. A display control device comprising:
an output control unit configured to control an output unit so as to display a display object associated with one application or each of multiple applications;
an action detection unit configured to detect a finger pointing direction of a user;
an application selection unit configured to select an application as an operation target based on the display object associated with the one application or each of the multiple applications and the finger pointing direction; and
a device state detection unit configured to detect a device state of an input unit corresponding to the output unit,
wherein the application selection unit selects the application as the operation target based on a device state of the display control device,
wherein the output control unit controls the output unit so that a predetermined operation corresponding to the application as the operation target is executed,
wherein the output control unit controls the output unit so that an operation object associated with the application as the operation target is displayed,
wherein the output control unit controls a position of the operation object based on the device state of the input unit
wherein the input unit exists separately in a plurality of devices,
wherein, when the device state of the input unit indicates whether or not the operation is receivable for every device, the output control unit controls the device so that the operation object is displayed by an output unit corresponding to a device capable of receiving the operation, and wherein the output control unit, the action detection unit, the application selection unit, and the device state detection unit are each implemented via at least one processor.

10. A display control device comprising:
an output control unit configured to control an output unit so as to display a display object associated with one application or each of multiple applications;
an action detection unit configured to detect a finger pointing direction of a user;
an application selection unit configured to select an application as an operation target based on the display object associated with the one application or each of the multiple applications and the finger pointing direction; and
a device state detection unit configured to detect a device state of an input unit corresponding to the output unit,
wherein the application selection unit selects the application as the operation target based on a device state of the display control device,
wherein the output control unit controls the output unit so that a predetermined operation corresponding to the application as the operation target is executed,
wherein the output control unit controls the output unit so that an operation object associated with the application as the operation target is displayed,
wherein the output control unit controls a position of the operation object based on the device state of the input unit
wherein, when the device state of the input unit indicates a position where a display object exists, the output control unit controls the output unit so that the operation object is displayed at least at a position where the display object does not exist, and
wherein the output control unit, the action detection unit, the application selection unit, and the device state detection unit are each implemented via at least one processor.

11. The display control device according to claim 1, further comprising:
an application state detection unit configured to detect, as an application state, a state of the one application or each of the multiple applications,
wherein the application selection unit further selects the application as the operation target based on the application state, and
wherein the application state detection unit is implemented via at least one processor.

12. A display control device comprising:
an output control unit configured to control an output unit so as to display a display object associated with one application or each of multiple applications;
an action detection unit configured to detect a finger pointing direction of a user;
an application selection unit configured to select an application as an operation target based on the display object associated with the one application or each of the multiple applications and the finger pointing direction; and
an application state detection unit configured to detect, as an application state, a state of the one application or each of the multiple applications,
wherein the application selection unit selects the application as the operation target based on a device state of the display control device and based on the application state, wherein the application state includes at least any one of information indicating whether or not an operation to an application is necessary, a time when the operation to the application becomes necessary, an elapsed time from execution start of the application, an elapsed time after a final operation to the application, or a distance between the user and a display object associated with the application, and
wherein the output control unit, the action detection unit, the application selection unit, and the application state detection unit are each implemented via at least one processor.

13. The display control device according to claim 1, wherein
the action detection unit detects a character string from a sound emitted from the user, and
the application selection unit selects, as the application as the operation target, an application identified by application identification information matching or similar to the character string.

14. The display control device according to claim 1, wherein
the action detection unit detects a line of sight of the user, and
the application selection unit selects, as the application as the operation target, an application associated with a display object existing on the line of sight.

15. The display control device according to claim 3, wherein
the output unit exists separately in a plurality of devices, and
the output control unit controls the device so that the operation object is displayed by a device corresponding to a position of the user.

16. The display control device according to claim 2, wherein
the output control unit controls the output unit so that the display object associated with the application as the operation target is moved to a position corresponding to a position of the user.

17. A display control method, implemented via a display control device, the method comprising:
controlling an output unit so as to display a display object associated with one application or each of multiple applications;
detecting a finger pointing direction of a user;
selecting an application as an operation target based on the display object associated with the one application or each of the multiple applications and the finger pointing direction; and
detecting a device state of the display control device,
wherein the application is selected as the operation target based on the device state of the display control device, and
wherein, when the device state of the display control device indicates non-connection to a network, an application that requires connection to the network from the application is excluded as the operation target.

18. A non-transitory computer-readable storage medium having embodied thereon a program, which when executed by a display control device of a computer causes the computer to execute a method, the method comprising:
controlling an output unit so as to display a display object associated with one application or each of multiple applications;

detecting a finger pointing direction of a user;
selecting an application as an operation target based on the display object associated with the one application or each of the multiple applications and the finger pointing direction; and
detecting a device state of the display control device,
wherein the application is selected as the operation target based on the device state of the display control device, and
wherein, when the device state of the display control device indicates non-connection to a network, an application that requires connection to the network from the application is excluded as the operation target.

* * * * *